United States Patent [19]

Allen

[11] 3,947,055

[45] Mar. 30, 1976

[54] AUXILIARY UNDERCARRIAGE FOR VEHICLES

[76] Inventor: James O. Allen, 1600 W. 7th St., Peoria, Ill. 61605

[22] Filed: June 9, 1975

[21] Appl. No.: 585,017

[52] U.S. Cl. .............................. 280/47.15; 214/370

[51] Int. Cl.$^2$ ........................................ B60S 13/00

[58] Field of Search ...... 280/47.15, 150 A, 47.13 R, 280/43.1, 78; 214/334, 330, 384, 370, 1 D; 301/38 R, 38 S; 254/2 B; 269/17

[56] References Cited

UNITED STATES PATENTS

| | | | |
|---|---|---|---|
| 1,120,938 | 12/1914 | Hazard | 280/47.15 |
| 1,183,894 | 5/1916 | Matthews | 280/47.15 |
| 1,447,758 | 3/1923 | Chagnon | 280/47.15 |
| 1,660,704 | 2/1928 | Chann | 280/47.15 |
| 1,756,006 | 4/1930 | Marks | 280/150 A |
| 2,226,521 | 12/1940 | McNamara | 214/334 |
| 2,228,689 | 1/1941 | Collins | 214/334 |
| 2,247,717 | 7/1941 | Sutter | 214/334 |
| 2,987,323 | 6/1961 | Miller | 280/150 A |
| 3,429,467 | 2/1969 | Steffe | 280/47.15 |
| 3,746,365 | 7/1973 | Kirschbaum | 280/150 A |

*Primary Examiner*—M. H. Wood, Jr.
*Assistant Examiner*—Milton L. Smith
*Attorney, Agent, or Firm*—Bernard L. Kleinke

[57] ABSTRACT

An auxiliary undercarriage for vehicles having pneumatic tires, one of which is flat, includes an elongated member for disposition under the vehicle adjacent the flat tire to help support its axle, a ramp at the rear end portion of the elongated member for guiding the axle to be supported upwardly therealong until it is disposed over a wheel journaled for rotation on the underside of the elongated member, and a clamping device on the front end portion of the elongated member for attaching releasably the elongated member to the nearest bumper of the vehicle. A normally engaged brake mechanism prevents the auxiliary undercarriage from rolling until a brake release device responsive to the axle being disposed above the wheel releases the brake for the wheel. As a result, once the clamping device is attached to the bumper and the brake is released automatically, the vehicle is free to be driven to a service station or other convenient location where the flat tire may be changed in a convenient manner.

10 Claims, 4 Drawing Figures

AUXILIARY UNDERCARRIAGE FOR VEHICLES

The present invention relates to an auxiliary undercarriage for vehicles, and it more particularly relates to such an undercarriage which enables the operator of the vehicle to drive such a vehicle having a flat pneumatic tire.

Vehicles, such as automobiles having pneumatic tires, are oftentimes rendered temporarily inoperative when a flat tire occurs. When a tire becomes damaged, the tire must be replaced with the spare tire and such an operation is not always convenient. Thus, in the past, various different auxiliary undercarriages and other such devices have been proposed to enable the driver of the vehicle to drive it at a reduced rate of speed to a service station or other location where the damaged tire may be replaced with the spare tire. In this regard, reference may be made to the following U.S. Pat. Nos. 2,226,521; 2,228,689; 2,247,717; and 2,987,323. The various different devices shown in those patents may be satisfactory for some applications, but it would be highly desirable to have an auxiliary undercarriage which is readily and conveniently attachable to a vehicle, and which is attached to the vehicle in a very secure manner so as to provide for the safety of the driver. Such an auxiliary undercarriage should be relatively inexpensive to manufacture, and it should be easily removed after it is used.

Therefore, the principal object of the present invention is to provide a new and improved auxiliary undercarriage for vehicles, which undercarriage is readily and conveniently adapted to be attached in a secure manner to the vehicle, and which is readily and conveniently attached and then removed from the vehicle.

Briefly, the above and further objects of the present invention are realized by providing an auxiliary undercarriage for vehicles, which undercarriage includes an elongated member for disposition under the vehicle adjacent a flat tire to help support its axle, a ramp device on the rear end portion of the elongated member for guiding the axle to be supported upwardly therealong until it is disposed above a wheel rollably supporting the elongated member, and a clamping device on the front end portion of the elongated member for attaching releasably the elongated member to the nearest bumper of the vehicle. A brake mechanism prevents the wheel from rolling until a brake release device is activated by engagement with the axle so that the auxiliary undercarriage becomes free to support rollably the weight of the vehicle and to take the place of the flat pneumatic tire once the clamping device is secured to the nearest bumper of the vehicle.

The above, and still further highly important objects and advantages of the invention will become apparent from the following detailed specification, appended claims, and attached drawings, wherein:

Figures 1, 2, 3, 4:
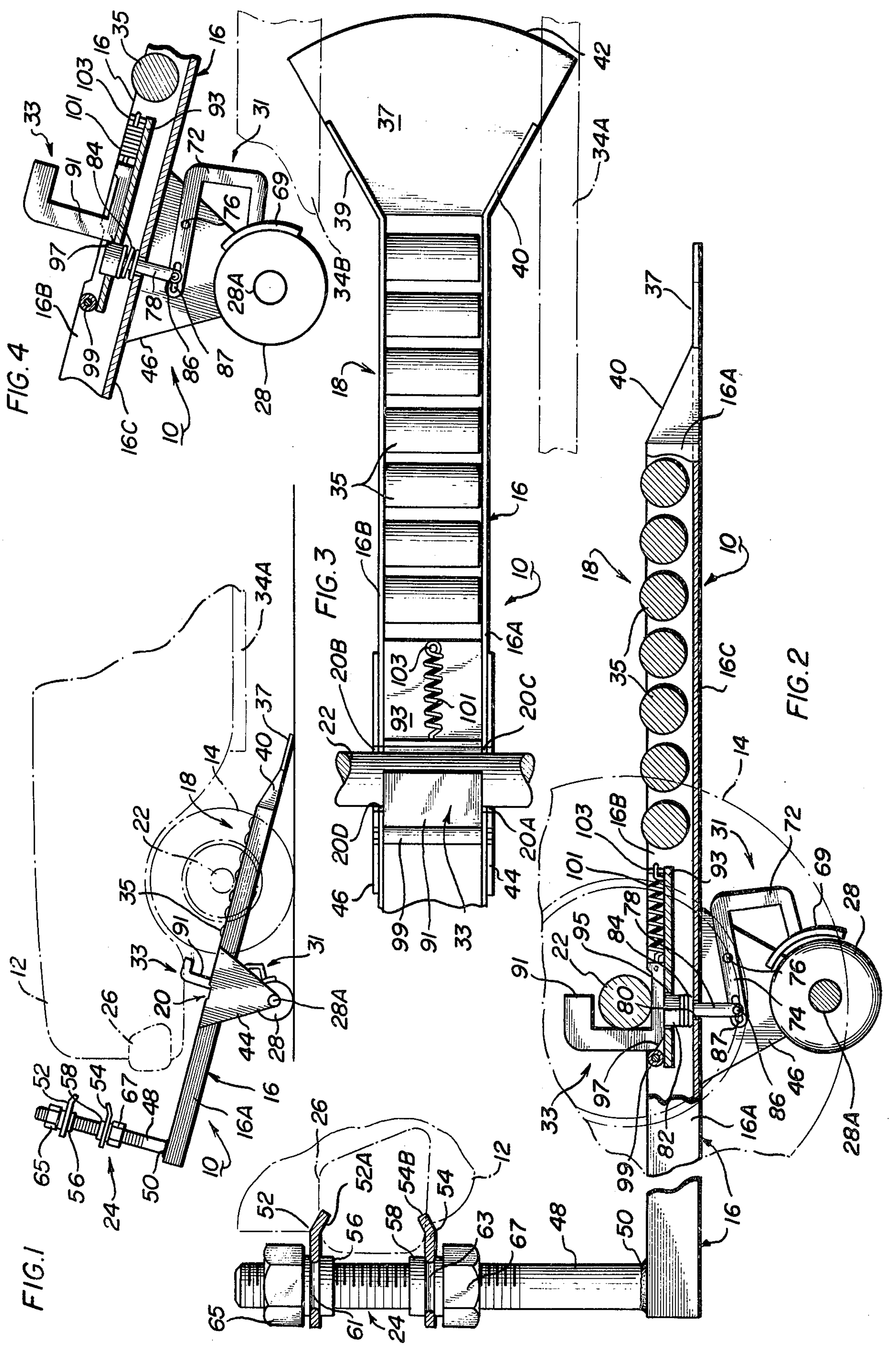
FIG. 1 is a side-elevational view of the auxiliary undercarriage constructed in accordance with the present invention, illustrating the manner in which it may be attached to a vehicle.
FIG. 2 is an enlarged fragmentary cross-sectional view, with portions thereof broken away, of the auxiliary undercarriage of FIG. 1, illustrating the undercarriage in its position when attached to the vehicle.
FIG. 3 is a fragmentary top plan view of the undercarriage of FIG. 2.
FIG. 4 is a fragmentary enlarged view of the auxiliary undercarriage of FIG. 1, illustrating it in its unattached position.

Referring now to the drawings, and more particularly to FIG. 1 thereof, there is shown an auxiliary undercarriage 10, which is constructed in accordance with the present invention, and which is adapted to be attached to the vehicle, such as the automobile 12, to serve as a temporary replacement for a flat pneumatic tire 14 of the vehicle 12. FIG. 1 illustrates the rear portion of the vehicle 12 in the process of backing up onto the auxiliary undercarriage 10, and FIG. 2 illustrates the vehicle 12 being positioned up onto the auxiliary undercarriage 10 which then serves to replace the rear flat pneumatic tire 14 which is still in place on the vehicle 12. As a result, with the auxiliary undercarriage 10 in position as indicated in FIG. 2, the vehicle 12 may be driven at slow speeds to a convenient location where the flat pneumatic tire 14 may be replaced with the spare tire (not shown).

The auxiliary undercarriage 10 generally comprises an elongated channel 16, which has a rear ramp portion 18 to guide the vehicle up onto the inclined elongated channel 16 until a locating notch or recess 20 receives the axle 22 supporting the tire 14, so that the channel 16 tilts into a horizontal position as indicated in FIG. 2. A clamping device 24 on the front end portion of the channel 16 may then be securely attached to the nearest bumper 26 of the vehicle 12 to rigidly maintain the channel 16 in its horizontal position as indicated in FIG. 2. A wheel 28 is journaled for rotation directly below the recess 20 so that the wheel 28, which is smaller than the tire 14, may take the place of the tire 14 for temporary purposes. A brake mechanism generally indicated at 31 normally prevents the undercarriage 10 from rolling when the vehicle 12 is being driven up onto the undercarriage 10. A brake release device generally indicated at 33 is activated in response to the axle 22 being disposed within the recess 20 for releasing the braking mechanism 31 to permit the auxiliary undercarriage 10 to partially support the axle 22 in place of the tire 14 once the clamping device 24 is attached releasably to the bumper 26. When the axle 22 drops into the recess 20, the axle 22 is disposed very slightly forwardly of the axle 28A of the wheel 28 so that the channel 16 pivots in a counter-clockwise direction as viewed in FIG. 1 about the wheel 28 until the rear portion 18 of the channel 14 engages the pair of longitudinally-extending vehicle frame members 34A and 34B to position the channel 16 in a horizontal orientation and to limit further counter-clockwise movement of the channel 16.

The frame members 34A and 34B may be any suitable and convenient rigid members disposed under the vehicle 12. It should also be understood that the auxiliary undercarriage 10 may be used to replace either one of the front tires as well. In the case of a front tire, instead of the axle 22, a frame member portion of the front suspension (not shown) would be supported by the auxiliary undercarriage 10 in the same manner as the axle 22 is supported. When used in connection with a front wheel, the vehicle 12 can still be driven and the vehicle 12 may be steered in a conventional manner while being driven slowly and making gentle turns, if necessary.

Considering now the rear portion of the channel 16 in greater detail, a series of rollers 35 extending transversely across the channel 16 help guide the axle 22 upwardly along the inclined channel 16 as indicated in FIG. 1 until it drops into the recess 20. A flat fan-shaped extension plate 37 at the terminal end portion of the rear portion 18 includes a pair of upstanding triangular reinforcing flanges 39 and 40 and is adapted to move into engagement with the frame members 34A and 34B as shown in FIG. 3 of the drawings to limit the tilting motion of the channel 16 when the axle 22 moves into engagement with the recess 20.

Considering now the locating recess 20 in greater detail with reference to FIG. 3 of the drawings, the recess 20 includes a pair of recesses 20A and 20B in the upper edges of a pair of triangularly-shaped plates 44 and 46, respectively, for supporting rollably the wheel 28, which is positioned between the plates depending from the channel 16 on opposite sides thereof, the upper edges of the plates 44 and 46 being flush with the upper edges of the channel 16. The notch 20 is also partially defined by a pair of notches or recesses 20C and 20D in the oppositely-disposed portions of the side walls 16A and 16B, respectively, of the channel 16, the notches or recesses 20A and 20C being disposed adjacent and in alignment with one another and the notches or recesses 20B and 20D being disposed adjacent and in alignment with one another as well as with the other notches or recesses 20A and 20C. The notch 20 is disposed slightly forwardly of a vertical plane extending through the center of the axle 28A of the wheel 28 to cause the channel 16 to pivot in a counter-clockwise direction when the axle 22 is disposed within the recess 20 as shown in FIG. 2.

Considering now the clamping device 26 in greater detail with reference to FIGS. 1 and 2 of the drawings, the device 24 includes an arm in the form of a threaded rod 48 fixedly secured to the front end portion of the channel 16 and extending upwardly at right angles thereto. The rod 48 may be composed of any rigid material, such as metal, and the channel 16 may also be composed of any suitable rigid material, such as metal. The rod 48 may be fixed to the channel 16 by any suitable technique, such as by the annular weld 50. A pair of clamping members or plates 52 and 54 are apertured to receive the respective sleeves 56 and 58 which include the respective peripheral grooves 61 and 63 as indicated in FIG. 2. In order to positionally adjust the clamping members 52 and 54 to grip the bumper 26 therebetween, a pair of nuts 65 and 67 are each fixed to the respective sleeves 56 and 58 by any suitable technique, such as by welding (not shown). Thus, after the channel 16 tilts to a horizontal position as shown in FIG. 2, the upper nut 65 is rotated until the clamping member 52 engages the upper portion of the bumper 26, and the lower nut 67 is rotated to move the lower clamping member 54 into engagement with the bumper 26 to secure it releasably therebetween. The clamping members 52 and 54 each includes an inclined distal end portion 52A and 54B, respectively, inclined toward the bumper 26 to serve as spring fingers to resiliently engage the bumper 26 for better engagement therewith.

Considering now the braking mechanism in greater detail with reference to FIGS. 2 and 4 of the drawings, the mechanism 31 includes a brake pad 69 which is curved to engage the treads of the wheel 28 for preventing it from rotating as shown in FIG. 4. An L-shaped link 72 is connected at one of its ends to the pad 69 and is integrally connected at its opposite end to one end portion of a bell crank 74 which is pivotally connected at 76 between the triangular plates 44 and 46. A rod 78 extends through an opening 80 in the bottom wall 16C of the channel 16 and is connected at its upper end to an enlarged head or block 82 for engaging the brake release device 33 which moves it downwardly under the force of a return spring coiled about the rod 78. The lower end portion of the rod 78 is pivotally connected at 86 to an elongated slot 87 in the end portion of the bell crank 74 opposite the end integrally connected to the link 72 so that when the rod 78 moves downwardly the bell crank 74 pivots in a counter-clockwise direction about the pivot point 76 as viewed in FIGS. 2 and 4 of the drawings to move the pad 69 out of engagement with the wheel 28 as shown in FIG. 2. When the rod 78 is urged in an upward direction by the return spring 84, the bell crank 74 pivots in a clockwise direction about the pivot point 76 as viewed in FIGS. 2 and 4 of the drawings until the pad 69 moves into engagement with the wheel 28 for preventing it from rotating so that the vehicle 12 may drive up onto it as indicated in FIGS. 1 and 4 of the drawings.

The brake release device 33 generally includes a C-shaped block 91 which is slidably mounted on a track or plate 93 mounted in a spaced-apart manner above the bottom wall 16C of the channel 16 and extends across and is welded to the opposite side wall 16A and 16B of the channel 16. As best seen in FIG. 2 of the drawings, an opening 95 in the track 93 receives the enlarged head or block 82, which is moved upwardly or downwardly therewithin as controlled by the brake mechanism 31. The C-shaped block 91 includes a cam surface 97 on the lower leading corner thereof to cam the block 82 in a downward direction within the hole or opening 95 to cause the brake mechanism 31 to free the wheel 28. A stop or rod 99 extending between the walls 16A and 16B is fixed therebetween to limit the forward movement of the C-shaped block 91. A return spring 101 is stretched between a pin 103 extending upwardly from the track 93 and the block 91 so that the block 91 snaps back toward the pin 103 to enable the block 82 to be urged upwardly by the return spring 84 and extend slightly above the track 93 as shown in FIG. 4. As a result, in order to remove the auxiliary undercarriage 10 from the vehicle 12, the clamping device 24 is released by rotating the nuts 65 and 67 to move them further apart to free the clamping plates 52 and 54 from the bumper 26. Thereafter, the rod 48 may be grasped to pull the auxiliary undercarriage 10 out from under the vehicle 12. As a result, as the channel 16 rolls out from under the vehicle 12, the return spring 101 is permitted to pull the block 91 back toward the pin 103 to a position as indicated in FIG. 4. Thereafter, the auxiliary undercarriage 10 is then prepared to be used once again.

While the present invention has been described in connection with a particular embodiment thereof, it will be understood that those skilled in the art may make many changes and modifications without departing from the invention. For example, various different kinds of materials, such as rigid plastic materials, may also be employed for the various different parts of the undercarriage 10, which is preferably entirely constructed of metal parts as disclosed herein. Accordingly, it is intended by the appended claims to cover all such changes and modifications as fall within the true spirit and scope of the invention.

What is claimed is:

1. An auxiliary undercarriage for vehicles having pneumatic tires rotatably mounted on axle means and having a pair of bumpers, comprising:

an elongated member for disposition under the vehicle adjacent one of the tires to help support its axle means;

wheel means mounted under said elongated member for supporting it rollably;

ramp means on the rear end portion of said elongated member for guiding the axle means to be supported upwardly therealong until the axle means is positioned above said wheel; and clamping means on the front end portion of said elongated member for attaching releasably said elongated member to the nearest one of the pair of bumpers.

2. An auxiliary undercarriage according to claim 1, wherein said rear end portion of said elongated member includes a flat plate.

3. An auxiliary undercarriage according to claim 1, further including a braking mechanism for preventing releasably said wheel means from rolling, a brake releasing means being responsive to the axle being disposed above said wheel means for causing said braking mechanism to free said wheel means for rotation.

4. An auxiliary undercarriage according to claim 3, wherein said braking mechanism including a brake pad for engaging said wheel means to prevent it from rolling, a linkage pivotally mounted on said elongated member being responsive to said brake releasing means for moving said brake pad into and away from engagement with said wheel means.

5. An auxiliary undercarriage according to claim 4, wherein said brake releasing means includes a C-shaped block slidably mounted on said elongated member to receive the axle.

6. An auxiliary undercarriage according to claim 5, further including first return spring means for urging resiliently said block toward said ramp means so that the axle carries said block against the force of said spring means.

7. An auxiliary undercarriage according to claim 6, further including a second return spring means for urging resiliently a portion of said linkage into the path of travel of said block, said portion of said linkage being reciprocatively movably mounted on said elongated member to move in a path of travel in a direction transverse to the path of travel of said block.

8. An auxiliary undercarriage according to claim 1, said ramp means including a plurality of rollers.

9. An auxiliary undercarriage according to claim 1, wherein said clamping device includes at least one positionally adjustable clamp member adapted to be moved adjustably in a vertical direction, an arm fixed to and extending from said elongated member to support said clamping member.

10. An auxiliary undercarriage according to claim 1, wherein said elongated member includes means defining a recess in the upper surface thereof for receiving the axle means.

* * * * *